L. W. MacMILLAN.
CYLINDER AND PISTON MECHANISM
APPLICATION FILED JULY 17, 1918.
1,431,317.
Patented Oct. 10, 1922.
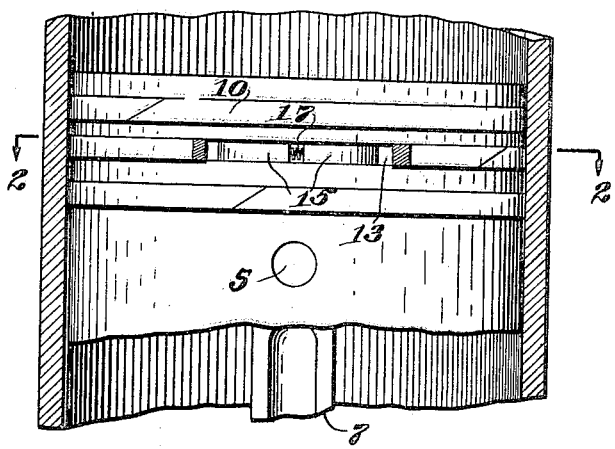
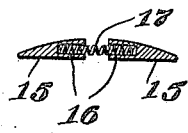
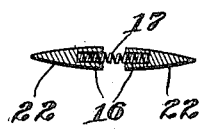
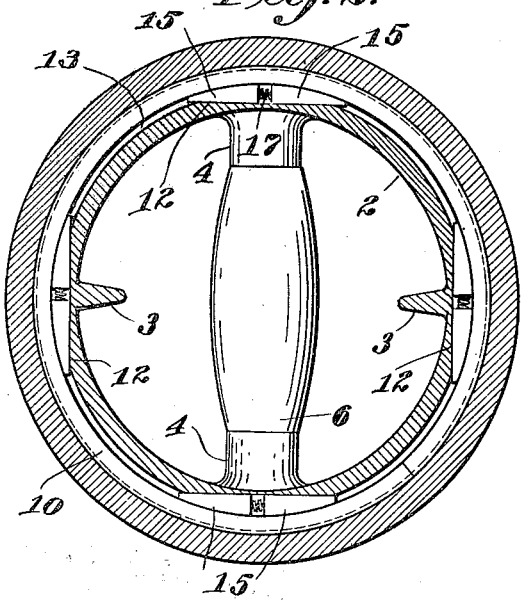
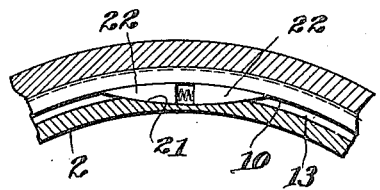
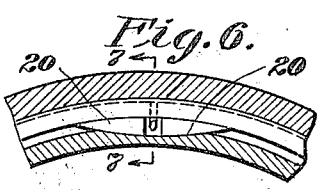
Inventor,
Latimer W. MacMillan
by Roberts Roberts & Cushman
Attorneys Patented Oct. 10, 1922.

1,431,317

UNITED STATES PATENT OFFICE.

LATIMER W. MacMILLAN, OF BOSTON, MASSACHUSETTS.

CYLINDER AND PISTON MECHANISM.

Application filed July 17, 1918. Serial No. 245,288.

*To all whom it may concern:*

Be it known that I, LATIMER W. MACMIL-LAN, a citizen of the United States, and a resident of Boston, in the county of Suffolk and State of Massachusetts, have invented new and useful Improvements in Cylinder and Piston Mechanism, of which the following is a specification.

This invention relates to cylinder and piston mechanism, and particularly such mechanism employing metallic packings for use in steam, explosion motor, pump or valve practice.

In many situations, particularly for the cylinders of reciprocating engines such as explosion motors for airplane and automobile power plants, the problem of maintaining a fluid-tight mechanically free contact between piston and cylinder heretofore has not been satisfactorily solved. Such motors are characteristically high-speed motors; the vibration due to unbalanced eccentric or reciprocating loads is a serious detriment to the employment of such motors, and it is the concern of engineers to avoid or reduce such vibrations. To this end the reciprocating masses of such engines are made as small and light as possible, recent practice, for instance in automobile engineering, calling for cast aluminum pistons operating in cast iron or mild steel cylinders.

The advantages of lightness of the aluminum [or a light alloy thereof] are somewhat offset by the higher coefficient of expansion, in the ratio of about 11 to 5, of the lighter metal. To enable its use at all, it is necessary to have a large expansion clearance between the opposed surfaces of cylinder and piston and to rely upon a packing bridging this expansion gap or clearance. In order that such packing shall be gas-tight without binding at various temperatures and after wear, it is necessary to provide for the expansion and contraction of the packing ring or rings independently of the piston and in response to the cylinder, and to provide for maintaining gas-tight contact between piston and ring in such a manner as to allow the piston to expand without forcing the packing ring or rings thereby into binding contact with the cylinder. If a packing ring, such as those commonly employed in the art, is sufficiently independent of the piston to prevent binding by piston expansion, then the large side motion of the piston permitted by the necessary clearance required by its difference in material from the cylinder has heretofore produced destructive phenomena, particularly cutting or wearing of the cylinder bore in the direction of the lateral thrusts at a greater rate than in another direction, so that cylinders provided with aluminum or light alloy pistons and rings of the ordinary practice frequently are found no longer to be circular, but to have been worn out to a great extent in directions at right angles to the crank shaft.

When a packing ring of ordinary construction is permitted to yield too freely for the above purposes, the piston also can move angularly out of axial alignment with the cylinder, and the packing leaks inevitably upon the occurrence of this motion and generally presents the phenomenon of being satisfactorily tight when the motor is stationary or turning slowly, but giving a large leakage when the motor is running in service, which leaking is sometimes never detected. In order to prevent this leakage when running the piston should not be able suddenly to yield diametrically to the cylinder.

I have found that the phenomenon of irregular wear or cutting of the cylinder does not occur unless some lateral or angular motion of the piston axis with respect to the cylinder axis is permitted, and that such motions are permitted by too ready yielding of rings. I have also found that it is necessary to provide for free expansion and contraction of the packing ring in response to slow changes of either piston or cylinder, such as temperature or wear changes, and not necessary to provide for rapid or forcible changes of expansion and contraction of the ring, such as those which are occasioned by mechanical forces acting during reciprocation of a piston having some lateral play or freedom.

Principal objects of the present invention are to lessen wear and leakage, as well as to provide means permitting different expansion and contraction of piston and cylinder and avoiding lateral or angular freedom of motion; and to provide a packing, piston and cylinder adapted relatively to expand and contract at slow rates, as in response to temperature or wear changes but which shall be rigid in relation to each other in a radial sense in response to sudden thrusts. Other objects are to provide for the efficient packing of pistons having a different coefficient of expansion from the cylinders with which they cooperate, and to increase the efficiency of the packing in respect to tightness and absence of friction between packing and cylinder.

In the accompanying drawings,—

Figure 1 is a diametrical section of a cylinder showing three packing rings, parts being broken away, in elevation;

Figure 2 is a section on line 2—2 of Fig. 1;

Figure 3 is a horizontal section through one packing ring abutment;

Figure 4 is a fragmentary figure similar to Fig. 2, illustrating a modification;

Figure 5 is a section similar to Fig. 3 of the former device shown in Fig. 4;

Figure 6 is a view similar to Fig. 2 illustrating another modification; and

Figure 7 is a section on line 7—7 of Fig. 6.

Referring now to Fig. 2, the cylinder 1 and piston 2 may be of any usual or desired construction. One usual construction is that shown, of which the piston is a casting having interior strengthening webs as at 3, and bosses as at 4, to provide bearings for a pin 5 upon which the pitman head 6 can turn in response to the rotation of the crank and lateral motion of the pitman 7. Such pistons in order to prevent binding by relative expansion are sloppily fitted in the cylinders, the diametrical clearance sometimes being as much as $\frac{1}{16}$ of an inch. As usual the piston has grooves 13 turned in its periphery, and packing rings 10 of any desired expansible construction seated in these grooves are relied upon to bridge the clearance space and maintain a gas-tight connection between the piston and the bore of the cylinder.

In order to permit the piston to expand and contract through the clearance with respect to the cylinder, an equal clearance within the ring groove and inside of the packing ring must be provided, with the result that when the ring is in position the piston is free laterally to move through its full clearance against first one side and then the other side of the cylinder. The forces tending to displace the piston laterally cause these areas of contact to lie first on one side and then on the other side of the piston, and unequal wear of both piston and cylinder results. This unequal wear is increased by the piston rocking on its axis, which cramps the usually hard spring metal piston rings against the cylinder walls, and sometimes causes them to behave as cutting edges, especially when lubrication is not maintained, and to be sprung sidewise in relation to their grooves and the cylinder, permitting leakage.

The present invention obviates this behavior of a piston and its rings, for instance such as the rings 10, by providing for said piston a rigid but slowly variable lateral support with respect to the cylinder, adapted to position the piston at all times in axial alignment with the cylinder. These supports may be arranged to position the piston against the inner surfaces of the rings, the supports being rigid against rapid thrusts occurring in the direction of a radius, but being adapted to yield for slow changes in the relative diameters of the cylinder, the piston and the ring due to wear or temperature. A piston so supported is not only held substantially in axial alignment with the axis of the cylinder, lateral motion of the piston through its clearance space with respect to the ring, and hence with respect to the cylinder, being prevented, but also acts upon the ring to position it and place it under such stress as to secure the proper gas-tight packing contact of the ring with both the cylinder and the grooves in the piston without such forcible contact as to bind the piston. For this reason supports of the kind mentioned preferably cooperate with the packing ring, but such supports may be provided for direct contact with the cylinder or with a spiral annulus not necessarily a part of the packing and still secure many of the advantages of my invention.

Many different ways of realizing the operative result by means responding to the genus constituting the present invention will occur to skilled engineers, but I prefer and have herein illustrated instances only of means adapted to operate on the new principles herein explained, for the broad purposes indicated, which instances are in themselves particularly well adapted for the purpose and practical to make and use.

For these purposes the supports referred to may be wedge structures arranged to interrupt any desired number of radial planes.

Referring now to Figs. 1, 2 and 3, the behavior of an acute-angled wedge, such as an arcuate wedge 15 subtending an angle between a flat base and an outer cylindrical surface whose tangents at the extremities of the wedge extend in the neighborhood of five degrees more or less on either side of a mean tangent making an angle of about 12°, more or less, with the base, is satisfactory in practice. Such a wedge when interposed between the piston and a ring, it being assumed that the surfaces are all machined surfaces, the material of the wedge the same as that of the ring, and the conditions of lubrication those usual in explosion-motor practice, is such that the wedge remains locked when the ring is compressed against the piston by sudden or heavy radial forces. But if the ring is subjected to comparatively gentle or long continued pressure of contraction toward the center of the piston, or to an expanding impulse from an expanding piston, under the conditions of service and lubrication mentioned such a wedge will readily yield to lengthen or shorten the radial distance controlled by it.

While I have mentioned one preferred shape of such a wedge, it will be understood that the shape is variable in response to the intended materials in contact with it or of which it is made and in response to the conditions of pressure, vibration and lubrication, temperature, etc., and that variations within considerable amounts of the angles and shapes mentioned may be employed without departure from the invention. In the instance shown, and assuming the proportionate dimensions of the parts indicated in Fig. 2, flats 12 may be provided in the bottom of the groove 13 for the rings 10, and on these flats opposed wedges 15, 15, of the kind explained may be seated, the outer faces of these wedges conforming to the mean inner curvature of the ring 10.

The wedges 15 are kept seated by a force tending to separate them. This may be provided for by bores 16 in the thick ends of the wedges 15 housing a light spring 17. The light pressure employed to seat the wedges 15 may be applied in other ways than by the spring 17, as will be apparent to those skilled in the art.

The leakage pressure on the working side of the piston may be utilized, for instance, see Figs. 6 and 7, by the provision of an inclined duct 19 leading into the space between wedges 20, 20, of desired form.

When the diameter of the piston and cylinder is large it may be difficult to secure for a desired nature of surface or particular material, etc., a sufficient angle for a supporting abutment or wedge mounted upon a seat defining a chord of the bottom of a groove 13. Under these circumstances I prefer to employ the device illustrated in Figs. 4 and 5, in which a curved seat 21 is formed in the bottom of the groove 13. Preferably the curvature is the same as the mean or primary curvature of the inner surface of the ring 10. Such a seat can be accurately cut by a milling cutter and for use with it wedges 22 having symmetrical curved faces at the desired mean angle can be advantageously provided, as shown in Figs. 4 and 5. The wedges 22 may be provided with bores 16 and spring 17 as in the case of wedges 15.

As illustrated in Fig. 2 the seats for the wedge structures may be distributed about the periphery of the piston as desired. Preferably the design is such as to bring the seats 12 for the wedges opposite strengthening webs 3, and to provide seats at the desired number of places, of which an opposite pair may lie in the plane perpendicular to the crank shaft.

One wedge 15 alone at each point of support is effective for the purpose, and in some cases the paired wedges shown may be replaced by similar single wedges having means for forcing them into engaging relation reacting with a fixed abutment at its seat, instead of against a like oppositely-placed wedge; and it will be understood that while the preferred arrangement is as described, it is not essential that the wedges should act in the planes of the rings, but that they may lie crosswise to these planes in some cases.

I claim:

1. Cylinder and piston mechanism for high-speed internal combustion engines having therein a cylinder, a relatively light piston having lateral clearance in the cylinder, one or more packings adapted to bridge the clearance space, and supports on the piston adapted rigidly to hold the piston in axial alignment with the cylinder against laterally acting sudden forces, said supports being adapted to yield to continued lateral pressure.

2. Cylinder and piston mechanism for high-speed internal combustion engines having therein a cylinder, a relatively light piston directed only by its bearing in respect to the cylinder walls, having lateral clearance in the cylinder, one or more packings adapted to bridge the clearance space, and supports on the piston adapted to hold the piston in axial alignment with the cylinder against laterally acting forces, the effective radial dimensions of the cylinder structure including said supports being variable in response to slow changes in the relative dimensions of the parts.

3. Cylinder and piston mechanism for high-speed internal combustion engines having therein a cylinder, a relatively light piston having lateral clearance in the cylinder, and one or more packings adapted to bridge the clearance space, in combination with wedge structures reacting with said parts along a plurality of radii of the piston adapted to yield to lengthen and shorten the effective radial dimensions of said radii under slowly acting forces, and adapted to resist sudden forces tending to lengthen or shorten such radial dimensions.

4. Cylinder and piston mechanism for high-speed internal combustion engines having therein, in combination with a cylinder and a piston of materials having different coefficients of expansion, an inherently expansible packing ring, a wedge structure adapted positively to resist sudden forces tending laterally to displace relatively the axis of said ring and piston and adapted automatically to yield to a force continuously acting in such direction.

5. Cylinder and piston mechanism for high-speed internal combustion engines having therein, in combination with a cylinder and a piston, a packing ring, and means adapted positively to resist sudden forces tending laterally to displace relatively the axis of said ring and piston, said means being adapted to yield slowly in response to a continued force transverse to said axes, and comprising the sole means for guiding the piston in relation to the cylinder.

6. Cylinder and piston mechanism for high-speed internal combustion engines having therein a cylinder, a relatively light piston, a packing ring, and means between the ring and the piston adapted to support the piston laterally on the inner surface of the ring, said means being adapted to yield to slowly acting or continued force, and not to yield to suddenly-acting forces.

7. Cylinder and piston mechanism for high-speed internal combustion engines having therein a cylinder, a relatively light piston of material having relatively to the piston a high coefficient of expansion, and spaced from the cylinder by a normally wide clearance space, a packing ring for the piston and means for maintaining the axes of said ring and piston in substantial alignment, said means comprising an element constructed and arranged rigidly to oppose relative lateral movement of the piston and ring under the action of sudden shocks, but to yield in response to continuously applied pressure.

8. In a high-speed internal combustion engine having a cylinder and piston of different materials having different coefficients of expansion, and normally subjected to a wide range of temperatures, a packing ring for the piston, and supporting means for keeping the piston in alignment interposed between the inner surface of the ring and the adjacent surface of the piston, said means being constructed and arranged constantly to maintain the position centered relative to the ring, but to yield in response to relative variations in diameter of the piston and ring.

9. In a high-speed internal combustion engine having a cylinder and piston of different materials having different coefficients of expansion, and normally subjected to a wide range of temperatures, in combination with the cylinder, a piston having lateral clearance therein, and packing rings for packing the clearance space between cylinder and piston, means for preventing lateral motion of the piston through the clearance space comprising rigid bodies removably interposed between piston and ring, and automatic means for shifting said bodies in response to temperature and other slow changes.

10. In a cylinder and piston mechanism for high-speed internal combustion engines having therein a cylinder, a relatively light piston having lateral clearance therein, and packing rings for packing the clearance space between cylinder and piston, means for preventing lateral motion of the piston through the clearance space comprising wedges removably interposed between piston and ring, and automatic means for shifting said wedges in response to temperature and other slow changes.

11. In a cylinder and piston mechanism for high-speed internal combustion engines having therein, in combination with the cylinder, a piston having lateral clearance therein, and an inherently expansible ring for packing the clearance-space between cylinder and piston, means for preventing lateral motion of the piston through the clearance-space comprising narrow-angle wedges removably interposed between piston and ring, and means for yieldingly holding said wedges seated between ring and piston with a light face.

12. In a high-speed internal combustion engine having a cylinder and piston of different materials having different coefficients of expansion, and normally subjected to a wide range of temperatures, means for supporting the piston coaxially with the cylinder comprising a packing ring tending to fit the cylinder and movable wedges between the piston and the ring adapted to change their position under slowly acting radially applied forces and to maintain their position under suddenly applied forces acting in said direction.

13. Means reacting between a packing ring and a piston to predetermine the relative position of said parts comprising wedges disposed in the direction of the periphery of the ring, said wedges having faces angular to respective radii of the cylinder, whereby to lock the respective wedges against displacement by a force suddenly acting in the direction of any of said radii.

14. Means reacting between a packing ring and a piston to predetermine the relative position of said parts comprising wedges disposed in the direction of the periphery of the ring, said wedges having faces at acute angles to each other and angular to respective radii of the cylinder, whereby to lock the respective wedges against displacement by a force suddenly acting in the direction of any of said radii, and to permit said wedge slowly to yield to continuous forces acting in the same direction.

15. Cylinder and piston mechanism for high-speed internal combustion engines having therein a cylinder, a relatively light piston having lateral clearance in the cylinder, one or more packings having lateral clearance with respect to the piston, and supports in the clearance space between said piston and one or more of said rings comprising acute-angled wedges lying across radial planes and means for gently forcing said wedges to seat respectively on the piston and the inner face of the ring.

16. Cylinder and piston mechanism having therein a cylinder, a piston having lateral clearance in the cylinder, one or more packings having lateral clearance with respect to the piston, and supports in the clearance space between said piston and one or more of said rings comprising pairs of acute-angled wedges lying across radial planes, and means for gently forcing each of a pair of said wedges in an opposite direction to seat respectively on the piston and the inner face of the ring.

17. In a high-speed internal combustion engine having a cylinder and piston of different materials having different coefficients of expansion, and normally subjected to a wide range of temperatures, means for supporting the piston coaxially within the cylinder comprising wedges movable between the piston and a ring bearing in the cylinder, the wedging surfaces being of such relation that their position is responsive to radial pressure induced by slow changes such as temperature changes, and is not responsive to sudden changes, such as lateral operating thrusts.

Signed by me at Boston, Massachusetts, this 11th day of July, 1918.

LATIMER W. MacMILLAN.